US008878947B2

(12) United States Patent
Miyasako

(10) Patent No.: US 8,878,947 B2
(45) Date of Patent: *Nov. 4, 2014

(54) IMAGE CAPTURING APPARATUS AND METHOD OF CONTROLLING IMAGE CAPTURING APPARATUS

(71) Applicant: Canon Kabushiki Kaisha, Tokyo (JP)

(72) Inventor: Kenich Miyasako, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/156,542

(22) Filed: Jan. 16, 2014

(65) Prior Publication Data

US 2014/0125826 A1    May 8, 2014

Related U.S. Application Data

(63) Continuation of application No. 12/966,363, filed on Dec. 13, 2010, now Pat. No. 8,698,904.

(30) Foreign Application Priority Data

Dec. 25, 2009    (JP) ................................. 2009-296384

(51) Int. Cl.
*H04N 5/228*    (2006.01)
*G03B 5/00*    (2006.01)
*H04N 5/232*    (2006.01)

(52) U.S. Cl.
CPC .............. *H04N 5/23264* (2013.01); *G03B 5/00* (2013.01); *G03B 2217/005* (2013.01); *G03B 2205/0007* (2013.01); *H04N 5/23248* (2013.01); *H04N 5/23287* (2013.01); *H04N 5/23267* (2013.01)
USPC .................. 348/208.5; 348/208.99

(58) Field of Classification Search
USPC .......................................... 348/208.99, 208.5
See application file for complete search history.

(56) References Cited

U.S. PATENT DOCUMENTS

| 7,432,953 | B2 * | 10/2008 | Washisu | 348/208.5 |
| 2005/0057662 | A1 * | 3/2005 | Washisu | 348/208.99 |
| 2005/0140793 | A1 | 6/2005 | Kojima et al. | |
| 2009/0040320 | A1 * | 2/2009 | Hirayama | 348/208.5 |
| 2009/0086035 | A1 * | 4/2009 | Suzuki et al. | 348/208.5 |

OTHER PUBLICATIONS

The above reference was cited in a European Office Action issued on Feb. 5, 2014, that issued in the corresponding European Patent Application No. 11187425.1.

* cited by examiner

*Primary Examiner* — James Hannett
(74) *Attorney, Agent, or Firm* — Cowan, Liebowitz & Latman, P.C.

(57) ABSTRACT

An image capturing apparatus comprises: at least one vibration detection unit configured to detect a vibration applied to the image capturing apparatus and outputting a vibration signal; a calculation unit configured to calculate, based on the vibration signal output from the vibration detection unit, respective vibration correction signals for a plurality of correction units for performing a plurality of different correction processes, respectively; the correction units configured to correct the vibration based on the respective vibration correction signals calculated by the calculation unit; and a control unit configured to, when stopping the plurality of correction processes based on the vibration correction signals, shift the correction units to initial states serving as states of the correction units obtained when the vibration is not detected, wherein the control unit controls to simultaneously start moving the correction units to the initial states, and simultaneously stop moving the correction units.

19 Claims, 11 Drawing Sheets

IMAGE CAPTURING APPARATUS AND METHOD OF CONTROLLING IMAGE CAPTURING APPARATUS

CROSS-REFERENCE TO RELATED APPLICATION

This application is a continuation of application Ser. No. 12/966,363, filed Dec. 13, 2010, the entire disclosures of which is hereby incorporated by reference.

BACKGROUND OF THE INVENTION

1. Field of the Invention

The present invention relates to an image capturing apparatus and a method of controlling an image capturing apparatus, and more particularly to a technique of correcting vibrations of an image capturing apparatus using both optical and electronic vibration correction systems in the image capturing apparatus.

2. Description of the Related Art

Recently, as image capturing apparatuses become more compact and the magnification produced by optical systems become higher, vibration of the image capturing apparatus can greatly degrade the quality of a captured image. Various vibration correction functions have been proposed, which correct the blur of a captured image, arising from vibration of the imaging apparatus. A conventional vibration correction function mounted in an image capturing apparatus is known in which the correction method uses both optical and electronic vibration correction systems (see, for example, Japanese Patent No. 2803072).

Firstly, the optical vibration correction system detects vibrations of the image capturing apparatus, and drives a vibration correction optical system to cancel the detected vibrations, thereby correcting the vibrations so that object light incident on the image sensor always enters the same position on the image sensing surface. Then, the electronic vibration correction system ascertains the displacement between images to detect the remaining vibrations that cannot be corrected for by the optical vibration correction system. The electronic vibration correction system moves the image read region to cancel the ascertained displacement between images, correcting for the remaining, low frequency, vibrations. In this way, the image capturing apparatus can improve the correction ability using both optical and electronic vibration correction systems.

The image capturing apparatus stops vibration correction control when, for example, the vibration correction setting is changed from ON to OFF via the menu operation of the image capturing apparatus or it is detected that the image capturing apparatus is set on a tripod. After that, the image capturing apparatus performs an operation to gradually return the position of the optical system for optical vibration correction and that of the read region for electronic vibration correction in preparation for the restart of the vibration correction control the next time.

However, the conventional correction method using both optical and electronic vibration correction systems suffers the following problems. More specifically, when the initial position return operation is executed independently for the position of the optical system of the optical vibration correction unit and for that of the read region for electronic vibration correction, the total speed of the initial position return operation changes if either initial position return operation ends first. The user may feel the return operation to be unnatural. Note that the initial position (initial state) means the position of the optical system of the optical vibration correction unit and that of the read region for electronic vibration correction when no vibration of the image capturing apparatus is detected.

SUMMARY OF THE INVENTION

The present invention has been made in consideration of the above situation, and effectively prevents the change in total speed of return operations to initial states when stopping the vibration correction control in an image capturing apparatus using a plurality of vibration correction systems such as optical and electronic vibration correction systems.

The present invention in its first aspect provides an image capturing apparatus comprising: at least one vibration detection unit configured to detect a vibration applied to the image capturing apparatus and outputting a vibration signal; a calculation unit configured to calculate, based on the vibration signal output from the vibration detection unit, respective vibration correction signals for a plurality of correction units for performing a plurality of different correction processes, respectively; the plurality of correction units configured to correct the vibration based on the respective vibration correction signals calculated by the calculation unit; and a control unit configured to, when stopping the plurality of correction processes based on the vibration correction signals, shift the plurality of correction units to initial states serving as states of the plurality of correction units obtained when the vibration is not detected, wherein the control unit controls to simultaneously start moving the plurality of correction units to the initial states, and simultaneously stop moving the plurality of correction units.

Further, the present invention in its second aspect provides an image capturing apparatus comprising: at least one vibration detection unit configured to detect a vibration applied to the image capturing apparatus and outputting a vibration signal; a calculation unit configured to calculate, based on the vibration signal output from the vibration detection unit, respective vibration correction signals for a plurality of correction units for performing a plurality of different correction processes, respectively; the plurality of correction units configured to correct the vibration based on the respective vibration correction signals calculated by the calculation unit; and a control unit configured to, when stopping the plurality of correction processes based on the vibration correction signals, shift the plurality of correction units to initial states serving as states of the plurality of correction units obtained when the vibration is not detected, wherein, as the plurality of correction units come close to the initial states, the control unit decrease speeds at which the correction unit are shifted, to be smaller than preset speeds.

Further, the present invention in its third aspect provides an image capturing apparatus comprising: at least one vibration detection unit configured to detect a vibration applied to the image capturing apparatus and outputting a vibration signal; a calculation unit configured to calculate, based on the vibration signal output from the vibration detection unit, respective vibration correction signals for a plurality of correction units for performing a plurality of different correction processes, respectively; the plurality of correction units configured to correct the vibration based on the respective vibration correction signals calculated by the calculation unit; and a control unit configured to, when stopping the plurality of correction processes based on the vibration correction signals, shift the plurality of correction units to initial states serving as states of the plurality of correction units obtained when the vibration is not detected, wherein, when end timings of shifting the plurality of correction units to the initial states do not coincide with each other, the control unit decreases a speed of shift, to the initial state, of correction unit which ends the shift to the initial state earliest among the plurality of correction units, to be smaller than a preset speed, and then ends the shift of the correction unit to the initial state.

Further, the present invention in its fourth aspect provides a method of controlling an image capturing apparatus including a plurality of correction units used for vibration correction, the method comprising: at least one type of vibration detection step of detecting a vibration applied to the image capturing apparatus and outputting a vibration signal; a calculation step of calculating, based on the vibration signal output from the vibration detection step, respective vibration correction signals for the plurality of correction units for performing a plurality of different correction processes, respectively; a correction control step of controlling the plurality of correction units for correcting the vibration based on the respective vibration correction signals calculated in the calculation step; and a control step of, when stopping the plurality of correction processes based on the vibration correction signals, shifting the plurality of correction units to initial states serving as states of the plurality of correction units obtained when the vibration is not detected, wherein the control step controls to simultaneously start moving the plurality of correction units to the initial states, and simultaneously stop moving the plurality of correction units.

Further, the present invention in its fifth aspect provides a method of controlling an image capturing apparatus including a plurality of correction units used for vibration correction, the method comprising: at least one type of vibration detection step of detecting a vibration applied to the image capturing apparatus and outputting a vibration signal; a calculation step of calculating, based on the vibration signal output from the vibration detection step, respective vibration correction signals for the plurality of correction units for performing a plurality of different correction processes, respectively; a correction control step of controlling the plurality of correction units for correcting the vibration based on the respective vibration correction signals calculated in the calculation step; and a control step of, when stopping the plurality of correction processes based on the vibration correction signals, shifting the plurality of correction units to initial states serving as states of the plurality of correction units obtained when the vibration is not detected, wherein in the control step, as the plurality of correction units come close to the initial states, speeds at which the correction unit are shifted are decreased to be smaller than preset speeds.

Further, the present invention in its sixth aspect provides a method of controlling an image capturing apparatus including a plurality of correction units used for vibration correction, the method comprising: at least one type of vibration detection step of detecting a vibration applied to the image capturing apparatus and outputting a vibration signal; a calculation step of calculating, based on the vibration signal output from the vibration detection step, respective vibration correction signals for the plurality of correction units for performing a plurality of different correction processes, respectively; a correction control step of controlling the plurality of correction units for correcting the vibration based on the respective vibration correction signals calculated in the calculation step; and a control step of, when stopping the plurality of correction processes based on the vibration correction signals, shifting the plurality of correction units to initial states serving as states of the plurality of correction units obtained when the vibration is not detected, wherein in the control step, when end timings of shifting the plurality of correction units to the initial states do not coincide with each other, a speed of shift, to the initial state, of correction unit which ends the shift to the initial state earliest among the plurality of correction units is decreased to be smaller than a preset speed, and then the shift of the correction unit to the initial state ends.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Embodiments of the present invention will be described in detail in accordance with the accompanying drawings. Note that vibration correction control in either the lateral or longitudinal direction of an image will be explained. Vibration correction control in the other direction is the same, so a description thereof will not be repeated.

First Embodiment

Figure 1:
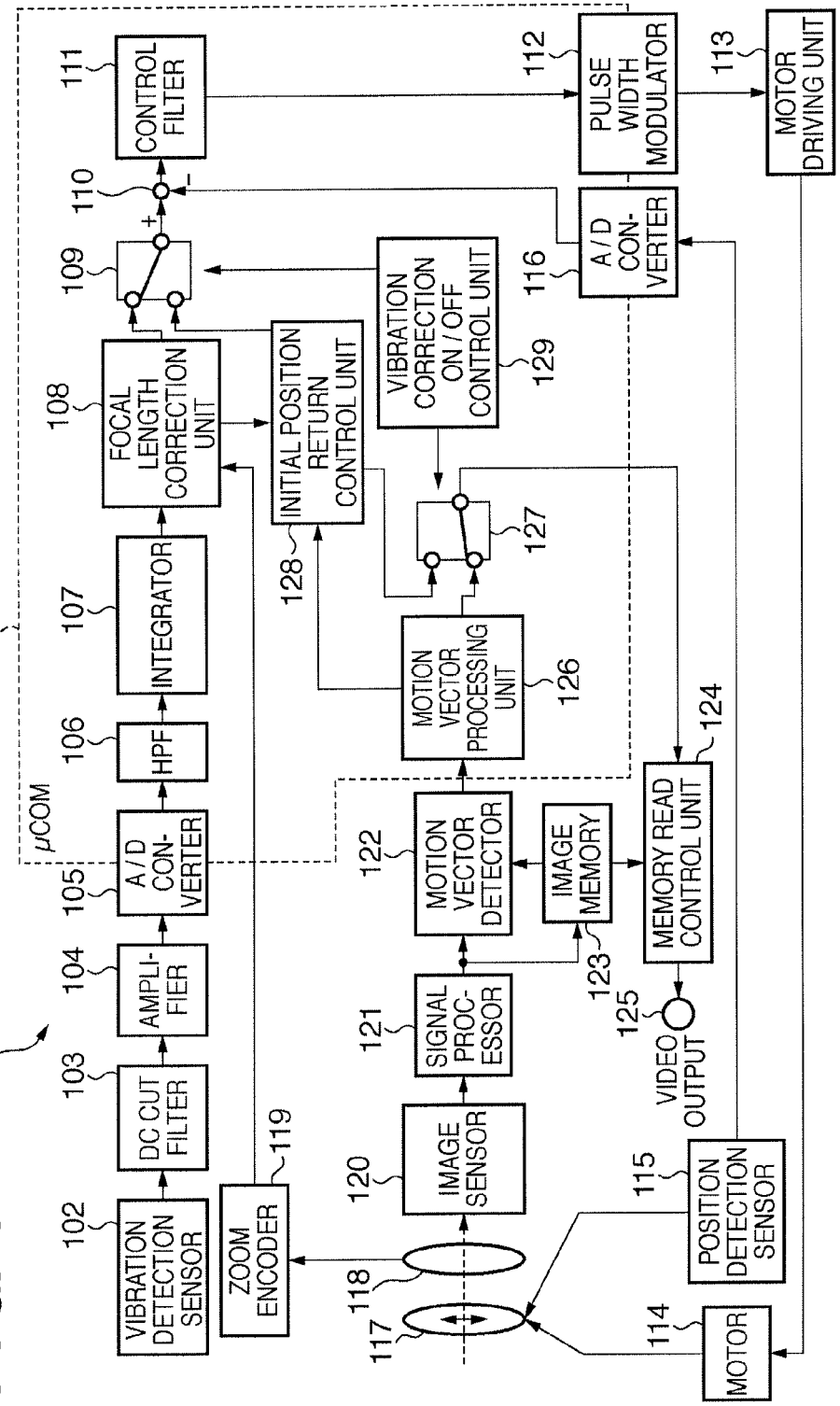
FIG. 1 is a block diagram of the arrangement of an image capturing apparatus in a first embodiment.

FIG. 1 is a block diagram exemplifying the arrangement of an image capturing apparatus 100 according to the first embodiment of the present invention. A vibration detection sensor 102 is, for example, a vibration gyro type angular velocity sensor. The vibration detection sensor 102 detects, as a vibration signal, vibrations applied to the apparatus owing to camera shake or the swing of the body, and provides a vibration signal to a DC cut-off filter 103. The DC cut-off filter 103 cuts off a direct current (DC) component contained in the vibration signal provided from the vibration detection sensor 102, and provides only the alternating current (AC) component, that is, vibration component of the vibration signal, to an amplifier 104. Note that the DC cut-off filter 103 is, for example, a high-pass filter (HPF) which cuts off an input signal in a predetermined frequency band. The amplifier 104 amplifies, to an optimum sensitivity, the vibration signal (vibration component) provided from the DC cut-off filter 103, and provides the amplified vibration signal to an A/D converter 105. The A/D converter 105 converts the vibration signal provided from the amplifier 104 into a digital vibration signal, and provides it as angular velocity data to an HPF 106 in a micro-computer (μCOM) 101.

The HPF 106 cuts off a low frequency component contained in the digital vibration signal (angular velocity data) output from the A/D converter 105, and outputs the resultant angular velocity data. An integrator 107 integrates the angular velocity data output from the HPF 106, and outputs the integration result as angular displacement data (vibration correction signal). A focal length correction unit 108 acquires current zoom position information from a zoom encoder 119 which detects the zoom position of an imaging optical system 118 for performing zooming and focusing operations. The focal length correction unit 108 calculates the focal length from the information. The focal length correction unit 108 calculates the correction driving amount of a correction optical system 117 based on the focal length information and the above-mentioned angular displacement data in a known manner.

The image capturing apparatus 100 allows the user to set, via a menu or the like, whether to perform vibration correction (vibration correction control ON) or not (vibration correction control OFF). A vibration correction ON/OFF control unit 129 determines the vibration correction control ON/OFF state of the image capturing apparatus 100. For example, when the user changes the vibration correction from ON to OFF via the menu of the image capturing apparatus 100, or when it is determined from a signal from the vibration detection sensor 102 that the image capturing apparatus 100 is set on a tripod, the vibration correction ON/OFF control unit 129 determines that the vibration correction control is OFF. Note that whether the image capturing apparatus 100 is set on a tripod may be determined using a method of determining that it is set on a tripod when a state in which the vibration signal (for example, the amplitude or frequency of the vibration signal) from the vibration detection sensor 102 is equal to or smaller than a predetermined value continues for a predetermined time or longer.

A switch 109 provides an adder/subtracter 110 with either an output from the focal length correction unit 108 or an output from an initial position return control unit 128. When the vibration correction ON/OFF control unit 129 determines that the vibration correction control is ON, the switch 109 provides an output from the focal length correction unit 108 to the adder/subtracter 110. When the vibration correction ON/OFF control unit 129 determines that the vibration correction control is OFF, the switch 109 provides an output from the initial position return control unit 128 to the adder/subtracter 110. Note that details of the operation of the initial position return control unit 128 will be described later.

The correction optical system 117 is, for example, a shift lens unit having a shift lens, and is movable in a direction perpendicular to the imaging optical axis. The optical system of the image capturing apparatus 100 includes the correction optical system 117 and imaging optical system 118, and forms an object image on an image sensor 120. A control filter 111 receives, via the adder/subtracter 110, the difference between an output from the switch 109, and a digital value (position detection data) obtained by converting, by an A/D converter 116, an output from a position detection sensor 115 which detects the position of the correction optical system 117. A pulse width modulator 112 converts an output from the control filter 111 into a PWM (Pulse Width Modulation) signal, and outputs the PWM signal. Based on the PWM signal from the pulse width modulator 112, a motor driving unit 113 drives a motor 114 for moving the correction optical system 117, thereby changing the optical path of light traveling toward the image sensing surface of the image sensor 120 and optically correcting a blur generated in the sensed image.

The image sensor 120 converts an object image formed via the optical system made up of the correction optical system 117 and imaging optical system 118 into an image signal. A signal processor 121 generates a video signal from the image signal obtained from the image sensor 120, and provides the video signal to a motion vector detector 122 and image memory 123. The motion vector detector 122 detects the motion vector of an image based on a luminance signal contained in the current video signal generated by the signal processor 121, and a luminance signal contained in the video signal of an immediately preceding field that is stored in the image memory 123.

A motion vector processing unit 126 calculates a control amount (vibration correction signal) for controlling an image read position in the image memory 123 to cancel the displacement between the images in accordance with the motion vector detected by the motion vector detector 122.

A switch 127 provides a memory read control unit 124 with either an output from the motion vector processing unit 126 or an output from the initial position return control unit 128. When the vibration correction ON/OFF control unit 129 determines that the vibration correction control is ON, the switch 127 provides an output from the motion vector processing unit 126 to the memory read control unit 124. When the vibration correction ON/OFF control unit 129 determines that the vibration correction control is OFF, the switch 127 provides an output from the initial position return control unit 128 to the memory read control unit 124.

The memory read control unit 124 determines an image read position in the image memory 123 in accordance with the control amount calculated by the motion vector processing unit 126 or an output from the initial position return control unit 128. As a result, a video signal obtained by electronically correcting vibrations is output from the image memory 123, and provided to a recording apparatus or display apparatus via a video output terminal 125.

Figure 2:
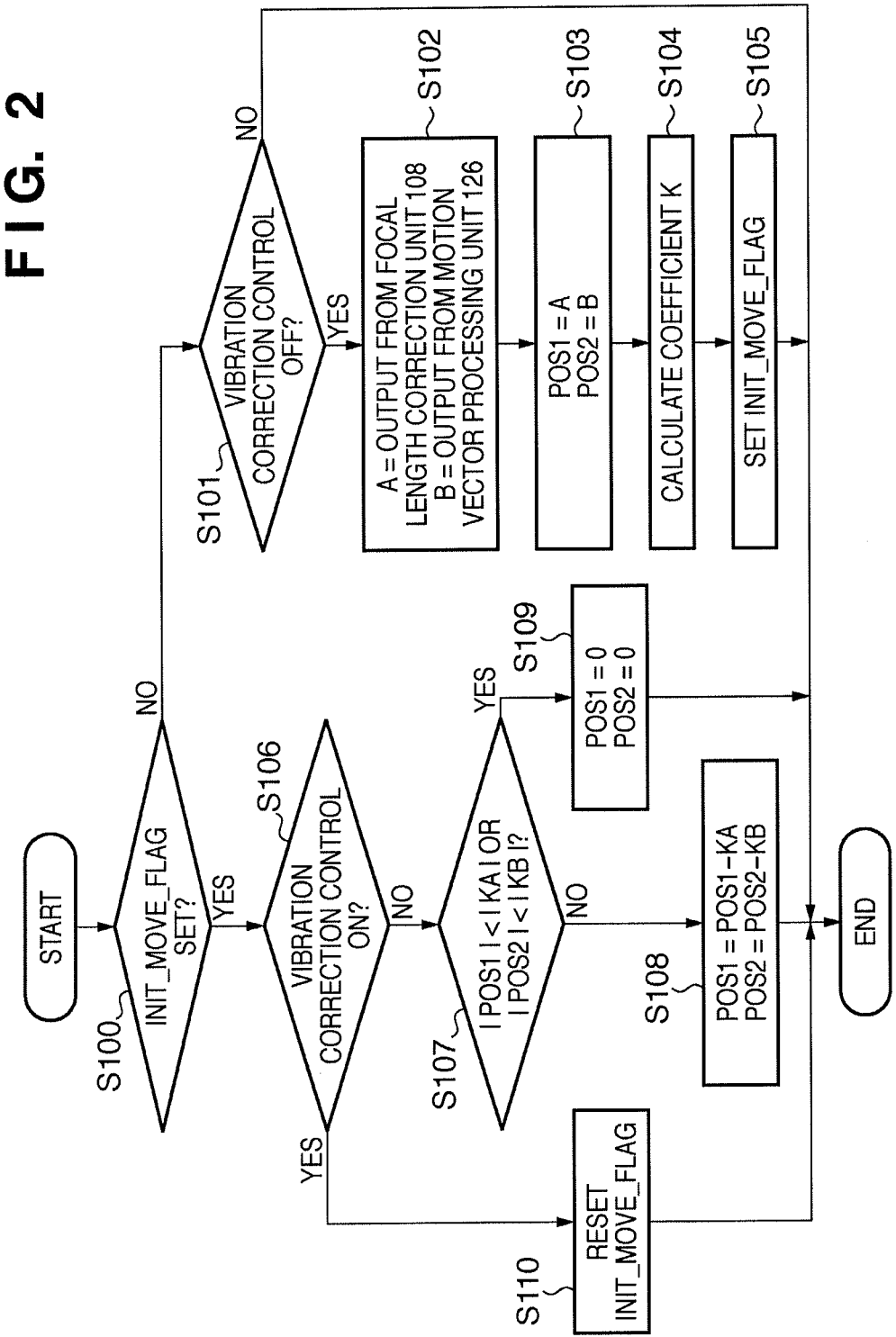
FIG. 2 is a flowchart explaining the return operation to the initial position by an initial position return control unit 128 in the first embodiment.

The operation of the initial position return control unit 128 in the first embodiment will be explained. FIG. 2 is a flowchart showing processing by the initial position return control unit 128. This processing is repeateadly performed in every predetermined period such as 1/60 sec.

In step S100, the initial position return control unit 128 determines whether a flag INIT_MOVE_FLAG indicating whether the initial position return operation has started has been set. If INIT_MOVE_FLAG has not been set, the initial position return control unit 128 determines that no initial position return operation has started, and shifts to a process in step S101.

In step S101, the initial position return control unit 128 determines whether the vibration correction ON/OFF control unit 129 has determined that the vibration correction control is OFF. If the vibration correction control is ON, the initial position return control unit 128 ends the processing; if it is OFF, shifts to a process in step S102.

In step S102, the initial position return control unit 128 stores a current output (correction driving amount) from the focal length correction unit 108 as a variable A, and stores a current output (control amount) from the motion vector processing unit 126 as a variable B. For descriptive convenience, assume that the relationship between the sign of a correction driving amount calculated by the focal length correction unit 108 and the correction direction is the same as that between the sign of a control amount calculated by the motion vector processing unit 126 and the correction direction. Also assume that, when a correction driving amount calculated by the focal length correction unit 108 and a control amount calculated by the motion vector processing unit 126 have the same value, a correction amount on the image sensing surface is also the same.

POS1 is a variable which is provided from the initial position return control unit 128 to the switch 109 and indicates an intermediate position during an operation of returning the correction optical system 117 to an initial position (initial state). POS2 is a variable which is provided from the initial position return control unit 128 to the switch 127 and indicates an intermediate position during an operation of returning the image read position in the image memory 123 by the memory read control unit 124 to an initial position (initial state). Note that these initial positions (initial states) mean the position (state) of the correction optical system 117 and an image read position (state) by the memory read control unit 124 when no vibration of the image capturing apparatus is detected. More specifically, the initial states are a state in which the center position of the shift lens of the correction optical system 117 coincides with the center of the optical axis of the image capturing apparatus and a state in which the center of the image read range coincides with that of an image held in the image memory 123.

In step S103, the initial position return control unit 128 sets, in POS1 and POS2, the values of the variables A and B obtained in step S102. That is, immediately after the vibration correction control is changed from ON to OFF, the latest correction positions calculated by the focal length correction unit 108 and motion vector processing unit 126 are held. Note that the initial positions are 0 for both POS1 and POS2.

In step S104, the initial position return control unit 128 calculates a coefficient K for calculating POS1 and POS2. A method of calculating the coefficient K will be described later. In step S105, the initial position return control unit 128 sets INIT_MOVE_FLAG and ends the processing.

On the contrary, if INIT_MOVE_FLAG is set in step S100, the initial position return control unit 128 shifts to a process in step S106. In step S106, the initial position return control unit 128 determines whether the vibration correction ON/OFF control unit 129 has determined that the vibration correction control is ON. If the vibration correction control is ON, the initial position return control unit 128 resets INIT_MOVE_FLAG in step S110 and ends the processing. Inputs to the switches 109 and 127 are switched to outputs from the focal length correction unit 108 and motion vector processing unit 126, respectively, and the vibration correction control starts.

If the initial position return control unit 128 determines in step S106 that the vibration correction control is OFF, it shifts to a process in step S107. In a process in step S108 to be described later, the correction optical system 117 is gradually moved toward the initial position by driving amount KA obtained by multiplying the value of the variable A obtained in step S102 and the K value calculated in step S104, in one processing of the flowchart of FIG. 2. Also, the image read position in the image memory 123 is gradually moved toward the initial position by driving amount KB obtained by multiplying the value of the variable B obtained in step S102 and the K value calculated in step S104, in one processing of the flowchart of FIG. 2.

In step S107, the initial position return control unit 128 determines whether the absolute values |POS1| and |POS2| of the current POS1 and POS2 are smaller than the absolute values |KA| and |KB| of the driving amounts to the initial positions at a time. If the absolute values |POS1| and |POS2| are equal to or larger than the absolute values |KA| and |KB|, the initial position return control unit 128 advances to step S108. In step S108, the initial position return control unit 128 changes POS1 to POS1=POS1-KA to provide the changed POS1 to the switch 109, and changes POS2 to POS2=POS2-KB to provide the changed POS2 to the switch 127, thereby gradually moving the correction optical system 117 and the image read position in the image memory 123 toward the initial positions. Then, the initial position return control unit 128 ends the processing. In other words, the driving amounts KA and KB are the change amounts of signal values provided to the switches 109 and 127 per unit time.

If the absolute values |POS1| and |POS2| are smaller than the absolute values |KA| and |KB|, neither the correction optical system 117 nor image read position in the image memory 123 can be moved by the driving amounts KA and KB of one time. In step S109, therefore, the initial position return control unit 128 sets POS1=0 and POS2=0, and provides them to the switches 109 and 127, thereby moving the correction optical system 117 and the image read position in the image memory 123 to the initial positions. The initial position return control unit 128 then ends the processing.

A method of calculating the coefficient K in step S104 immediately after changing the vibration correction control from ON to OFF will be described. The calculation method will be explained separately for respective cases based on the relationship in sign and value between the correction driving amount A immediately before changing the vibration correction control from ON to OFF, and the current control amount B, which are calculated by the focal length correction unit 108 and motion vector processing unit 126.

(1) Case in Which A and B Have Same Sign

The coefficient K is determined so that the sum of the driving amounts KA and KB to the initial positions in one processing of the flowchart of FIG. 2 becomes a predetermined driving amount MOVE_STEP (>0) or −MOVE_STEP. More specifically, the coefficient K is determined so that a speed (to be referred to as a "total initial position return speed") obtained by adding speeds (to be referred to as "initial position return speeds") for returning the correction optical system 117 and the read position by the memory read control unit 124 to the initial positions becomes constant:

$KA+KB=\text{MOVE\_STEP}$ (for A>0 and B>0)

$KA+KB=-\text{MOVE\_STEP}$ (for A<0 and B<0)

Solving these equations yields K values:

$$K = \text{MOVE\_STEP}/(A+B) \text{ (for } A>0 \text{ and } B>0\text{)}$$

$$K = -\text{MOVE\_STEP}/(A+B) \text{ (for } A<0 \text{ and } B<0\text{)}$$

The time taken from the start to end of the return operation to the initial position is as follows. In the following description, the unit of time is 1=one cycle in which processing of the flowchart of FIG. 2 is executed.

The initial position return time of the correction optical system 117:

$$|A/(KA)| = |1/K| = |A+B|/\text{MOVE\_STEP}$$

The initial position return time of the memory read control unit 124:

$$|B/(KB)| = |1/K| = |A+B|/\text{MOVE\_STEP}$$

From this, the times taken from the start to end of returning the correction optical system 117 and the read position by the memory read control unit 124 to the initial positions become equal.

Figure 3A:
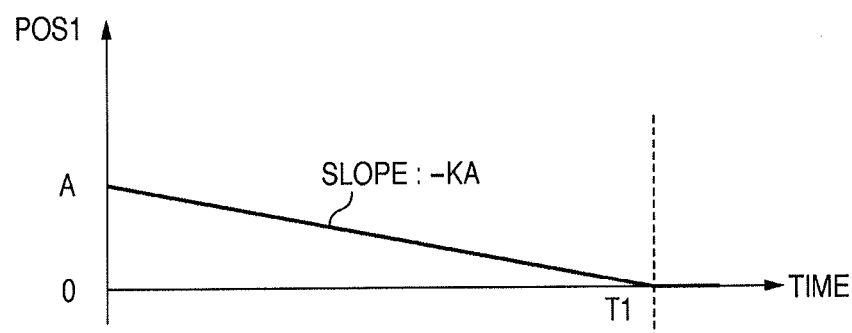
FIGS. 3A to 3C are graphs showing an example of shift of the return operations of a correction optical system 117 and a read position by a memory read control unit 124 to the initial positions when the vibration correction control is changed from ON to OFF in the first embodiment.
Figure 3B:
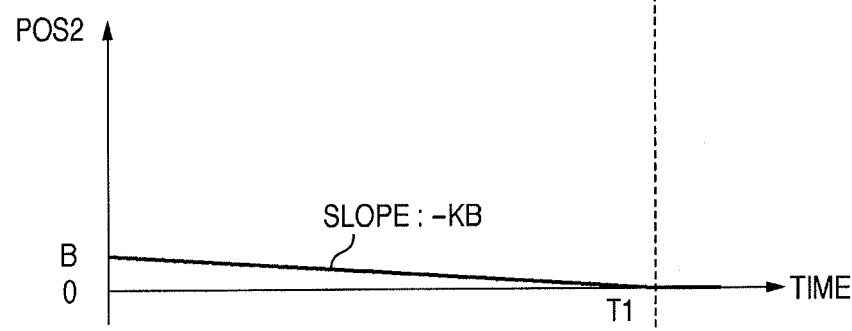
Figure 3C:
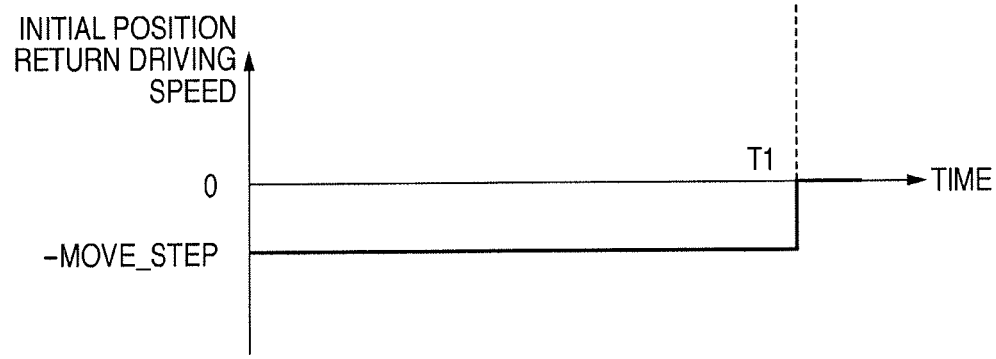

FIGS. 3A to 3C are graphs showing shift of the return operations of the correction optical system 117 and the read position by the memory read control unit 124 to the initial positions. In FIG. 3A, the ordinate indicates the intermediate position POS1 in the return operation of the correction optical system 117 to the initial position, and the abscissa indicates the time. In FIG. 3B, the ordinate indicates the intermediate position POS2 in the return operation of the read position by the memory read control unit 124 to the initial position, and the abscissa indicates the time. FIGS. 3A and 3B show loci until the correction optical system 117 and the read position by the memory read control unit 124 return to the initial positions, by setting, as 0, the time when the vibration correction control switches from ON to OFF. In the example shown in FIGS. 3A and 3B, the variables A and B are positive. The correction optical system 117 and the read position by the memory read control unit 124 move toward the initial positions by −KA and −KB per unit time, respectively, and return to the initial positions at time T1 (=|A+B|/MOVE_STEP).

In the graph of FIG. 3C, the ordinate indicates the sum (total initial position return speed) of the moving amounts of the correction optical system 117 and the read position by the memory read control unit 124 per unit time, and the abscissa indicates the time. As shown in FIG. 3C, according to the first embodiment, the start timings and end timings of the return operations of the correction optical system 117 and the read position by the memory read control unit 124 to the initial positions coincide with each other. This can prevent a phenomenon in which one return operation ends first and the total initial position return speed changes during the operation.

(2) Case in Which A and B Have Different Signs and Different Absolute Values

The coefficient K is determined so that the sum of the driving amounts KA and KB to the initial positions in one processing of the flowchart of FIG. 2 becomes a predetermined driving amount MOVE_STEP (>0) or −MOVE_STEP. More specifically, the coefficient K is determined so that a speed (total initial position return speed) obtained by adding the initial position return speeds of the correction optical system 117 and the read position by the memory read control unit 124 becomes constant:

$$KA + KB = \text{MOVE\_STEP} \text{ (for } A+B>0\text{)}$$

$$KA + KB = -\text{MOVE\_STEP} \text{ (for } A+B<0\text{)}$$

Solving these equations yields K values:

$$K = \text{MOVE\_STEP}/(A+B) \text{ (for } A+B>0\text{)}$$

$$K = -\text{MOVE\_STEP}/(A+B) \text{ (for } A+B<0\text{)}$$

The time taken from the start to end of the initial position return operation is as follows:

The initial position return time of the correction optical system 117:

$$|A/(KA)| = |1/K| = |A+B|/\text{MOVE\_STEP}$$

The initial position return time of the memory read control unit 124:

$$|B/(KB)| = |1/K| = |A+B|/\text{MOVE\_STEP}$$

In this way, the times taken from the start to end of returning the correction optical system 117 and the read position by the memory read control unit 124 to the initial positions become equal.

Figure 4A:
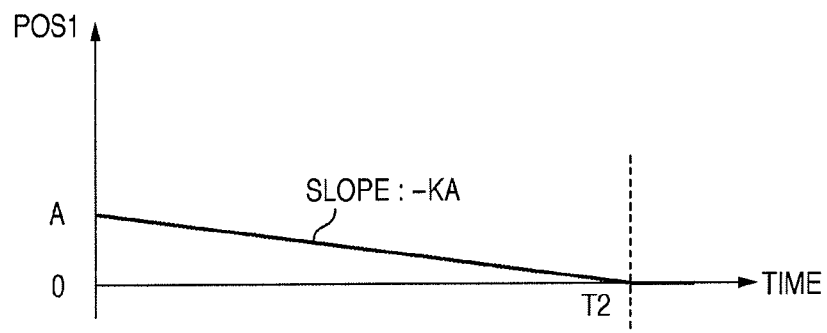
FIGS. 4A to 4C are graphs showing another example of shift of the return operations of the correction optical system 117 and the read position by the memory read control unit 124 to the initial positions when the vibration correction control is changed from ON to OFF in the first embodiment.
Figure 4B:
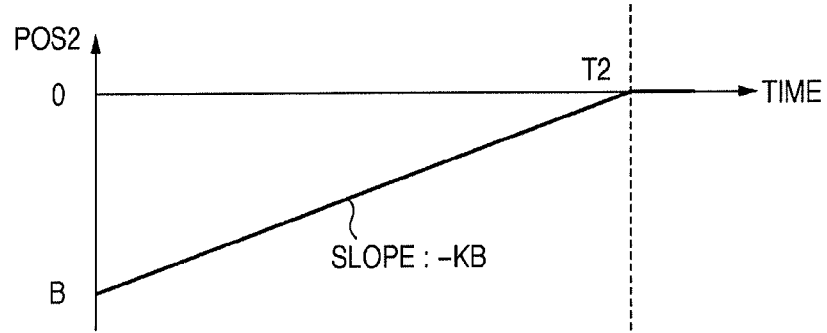
Figure 4C:
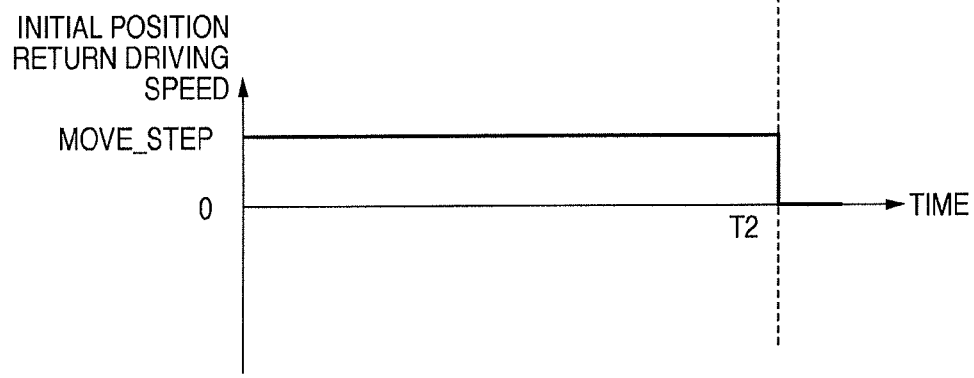

FIGS. 4A to 4C are graphs showing shift of the return operations of the correction optical system 117 and the read position by the memory read control unit 124 to the initial positions. In FIG. 4A, the ordinate indicates the intermediate position POS1 in the return operation of the correction optical system 117 to the initial position, and the abscissa indicates the time. In FIG. 4B, the ordinate indicates the intermediate position POS2 in the return operation of the read position by the memory read control unit 124 to the initial position, and the abscissa indicates the time. FIGS. 4A and 4B show loci until the correction optical system 117 and the read position by the memory read control unit 124 return to the initial positions, by setting, as 0, the time when the vibration correction control switches from ON to OFF. In the example shown in FIGS. 4A and 4B, the variable A is positive and the variable B is negative. The correction optical system 117 and the read position by the memory read control unit 124 move toward the initial positions by −KA and −KB per unit time, respectively, and return to the initial positions at time T2 (=|A+B|/MOVE_STEP).

In the graph of FIG. 4C, the ordinate indicates the sum (total initial position return speed) of the moving amounts of the correction optical system 117 and the read position by the memory read control unit 124 per unit time, and the abscissa indicates the time. As shown in FIG. 4C, according to the first embodiment, the start timings and end timings of the return operations of the correction optical system 117 and the read position by the memory read control unit 124 to the initial positions coincide with each other. In other words, the correction optical system 117 and memory read control unit 124 simultaneously start the return operations to the initial positions, and simultaneously end them. This can prevent a phenomenon in which driving of either the correction optical system 117 or the memory read control unit 124 to the initial position ends first and the direction of the return operation to the initial position is reversed during the operation.

(3) Case in Which A and B Have Different Signs and Same Absolute Value

The coefficient K is determined so that each of the driving amounts KA and KB of the correction optical system 117 and the read position by the memory read control unit 124 to the initial positions in one processing of the flowchart of FIG. 2 becomes a predetermined driving amount MOVE_STEP (>0) or −MOVE_STEP. More specifically, the coefficient K is determined so that the initial position return speed of each of the correction optical system 117 and the read position by the memory read control unit 124 becomes constant:

$KA$=MOVE_STEP, $KB$=−MOVE_STEP (for $A$>0 and $B$<0)

$KA$=−MOVE_STEP, $KB$=MOVE_STEP (for $A$<0 and $B$>0)

Solving these equations yields K values:

$K$=MOVE_STEP/$A$ (for $A$>0 and $B$<0)

$K$=−MOVE_STEP/$A$ (for $A$>0 and $B$<0)

The time taken from the start to end of the initial position return operation is as follows:

The initial position return time of the correction optical system 117:

$|A/(KA)|=|1/K|=|A|/$MOVE_STEP

The initial position return time of the memory read control unit 124:

$|B/(KB)|=|1/K|=|A|/$MOVE_STEP

These equations reveal that the times taken from the start to end of returning the correction optical system 117 and the memory read control unit 124 to the initial positions become equal. That is, when the correction optical system 117 and memory read control unit 124 simultaneously start returning to the initial positions, they return to the initial positions simultaneously.

Figure 5A:
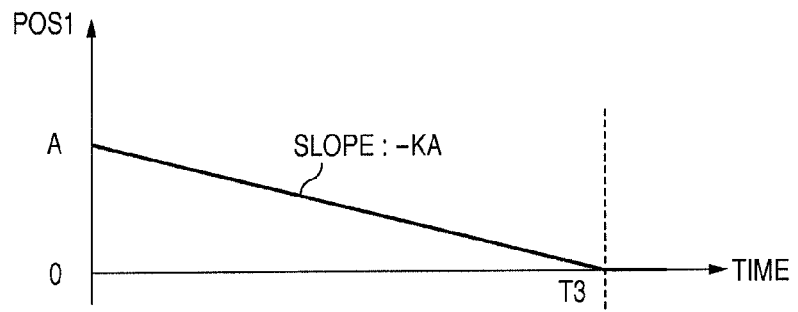
FIGS. 5A to 5C are graphs showing still another example of shift of the return operations of the correction optical system 117 and the read position by the memory read control unit 124 to the initial positions when the vibration correction control is changed from ON to OFF in the first embodiment.
Figure 5B:
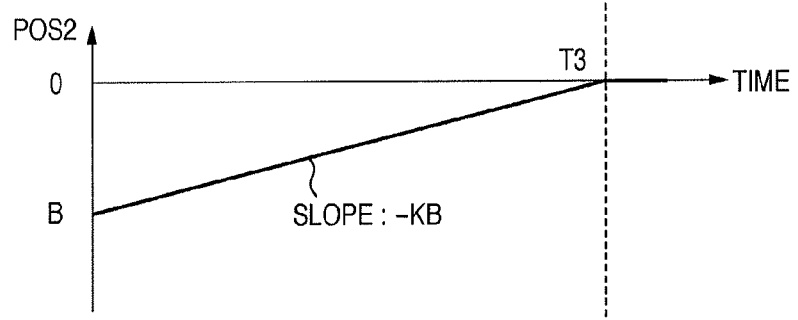
Figure 5C:
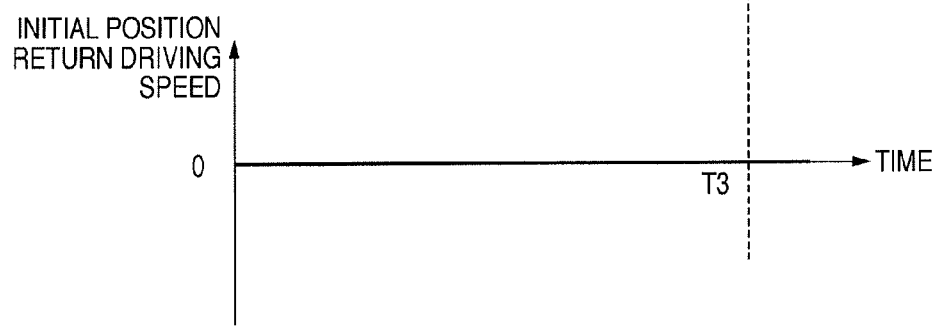

FIGS. 5A to 5C are graphs showing shift of the return operations of the correction optical system 117 and the read position by the memory read control unit 124 to the initial positions. In FIG. 5A, the ordinate indicates the intermediate position POS1 in the return operation of the correction optical system 117 to the initial position, and the abscissa indicates the time. In FIG. 5B, the ordinate indicates the intermediate position POS2 in the return operation of the read position by the memory read control unit 124 to the initial position, and the abscissa indicates the time. FIGS. 5A and 5B show loci until the correction optical system 117 and the read position by the memory read control unit 124 return to the initial positions, by setting, as 0, the time when the vibration correction control switches from ON to OFF. In the example shown in FIGS. 5A and 5B, the variable A is positive and the variable B is negative. The correction optical system 117 and the read position by the memory read control unit 124 move toward the initial positions by −KA and −KB per unit time, respectively, and the initial position return operations end at time T3 (=|A|/MOVE_STEP).

In the graph of FIG. 5C, the ordinate indicates the sum (total initial position return speed) of the moving amounts of the correction optical system 117 and the read position by the memory read control unit 124 per unit time, and the abscissa indicates the time. As shown in FIG. 5C, according to the first embodiment, the start timings and end timings of the return operations of the correction optical system 117 and the read position by the memory read control unit 124 to the initial positions coincide with each other as if no return operation to the initial position was done in an image. This can prevent a phenomenon in which driving of either the correction optical system 117 or memory read control unit 124 to the initial position ends first and the direction of the return operation to the initial position is reversed during the operation.

As described above, according to the first embodiment, the start timings and end timings of return operations to initial positions after switching the vibration correction control from ON to OFF can coincide with each other in an image capturing apparatus which performs the vibration correction control using a plurality of vibration correction systems. The first embodiment can effectively prevent the change in total speed of return operations to initial positions when the operation of one vibration correction system ends first, which has occurred in a conventional apparatus.

Second Embodiment

Figure 6:
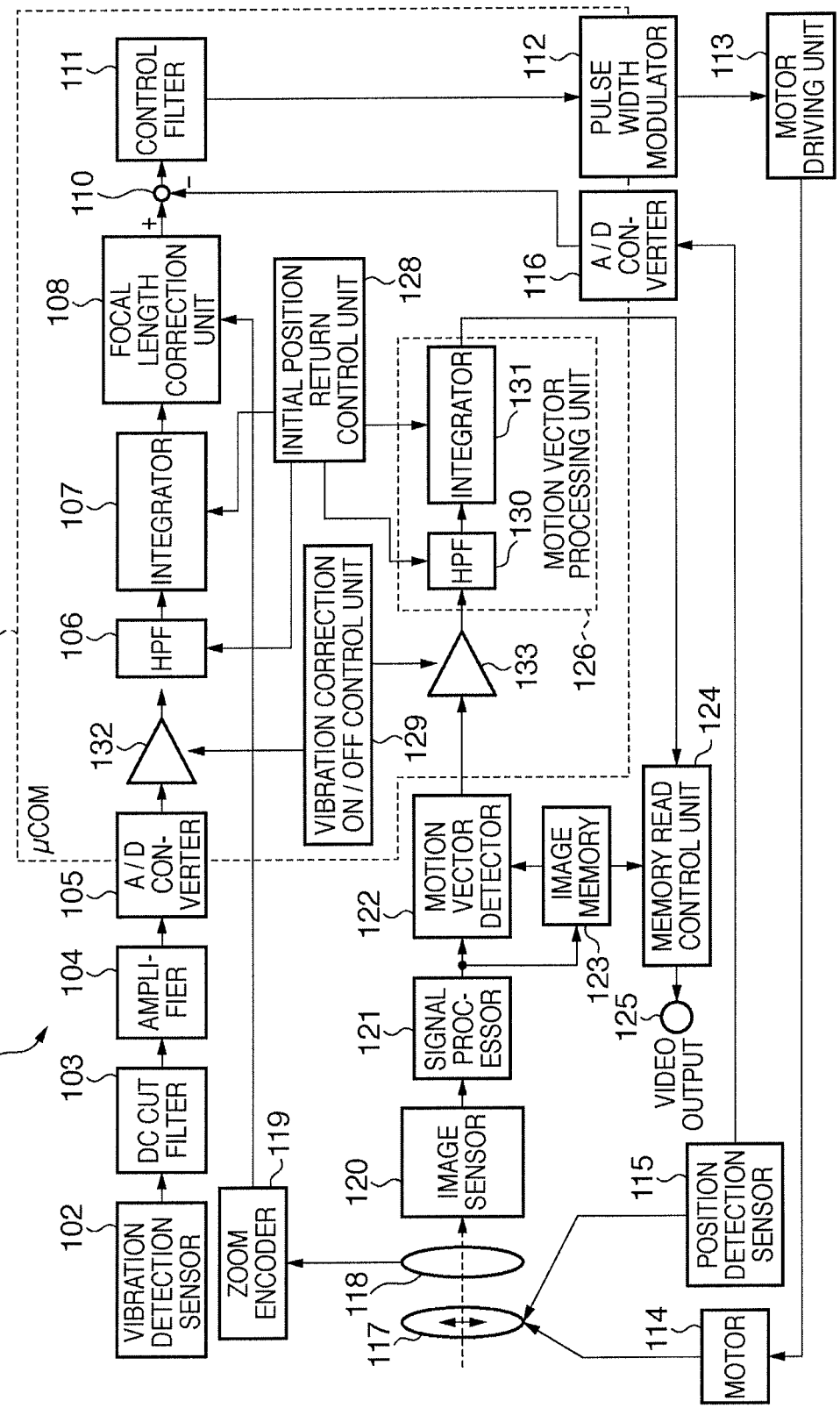
FIG. 6 is a block diagram of the arrangement of an image capturing apparatus in a second embodiment.

FIG. 6 is a block diagram exemplifying the arrangement of an image capturing apparatus 150 according to the second embodiment of the present invention. The arrangement shown in FIG. 6 is different from that shown in FIG. 1 in that the switches 109 and 127 are deleted, multipliers 132 and 133 are added, and the operations of a motion vector processing unit 126, initial position return control unit 128, and vibration correction ON/OFF control unit 129 are changed. The remaining arrangement is the same as that shown in FIG. 1, and a description thereof will not be repeated.

When the vibration correction ON/OFF control unit 129 determines that the vibration correction control is ON, the multiplier 132 sets a gain of 1, and directly provides an output from an A/D converter 105 to an HPF 106. When the vibration correction ON/OFF control unit 129 determines that the vibration correction control is OFF, the multiplier 132 sets a gain of 0, and always inputs 0 to the HPF 106, stopping the vibration correction control by a correction optical system 117.

Similarly, when the vibration correction ON/OFF control unit 129 determines that the vibration correction control is ON, the multiplier 133 sets a gain of 1, and directly provides an output from a motion vector detector 122 to the motion vector processing unit 126. When the vibration correction ON/OFF control unit 129 determines that the vibration correction control is OFF, the multiplier 133 sets a gain of 0, and always inputs 0 to the motion vector processing unit 126, stopping the vibration correction control by a memory read control unit 124.

The motion vector processing unit 126 in the second embodiment includes an HPF 130 and integrator 131. The HPF 130 receives, via the multiplier 133, a motion vector detected by the motion vector detector 122, and removes the low frequency component of the motion vector detection value. The integrator 131 integrates an output signal from the HPF 130, and determines an image read position in an image memory 123 by the memory read control unit 124. Accordingly, a video signal obtained by electronically correcting vibrations is output from the image memory 123, and provided to a recording apparatus or display apparatus via a video output terminal 125.

Figure 7:
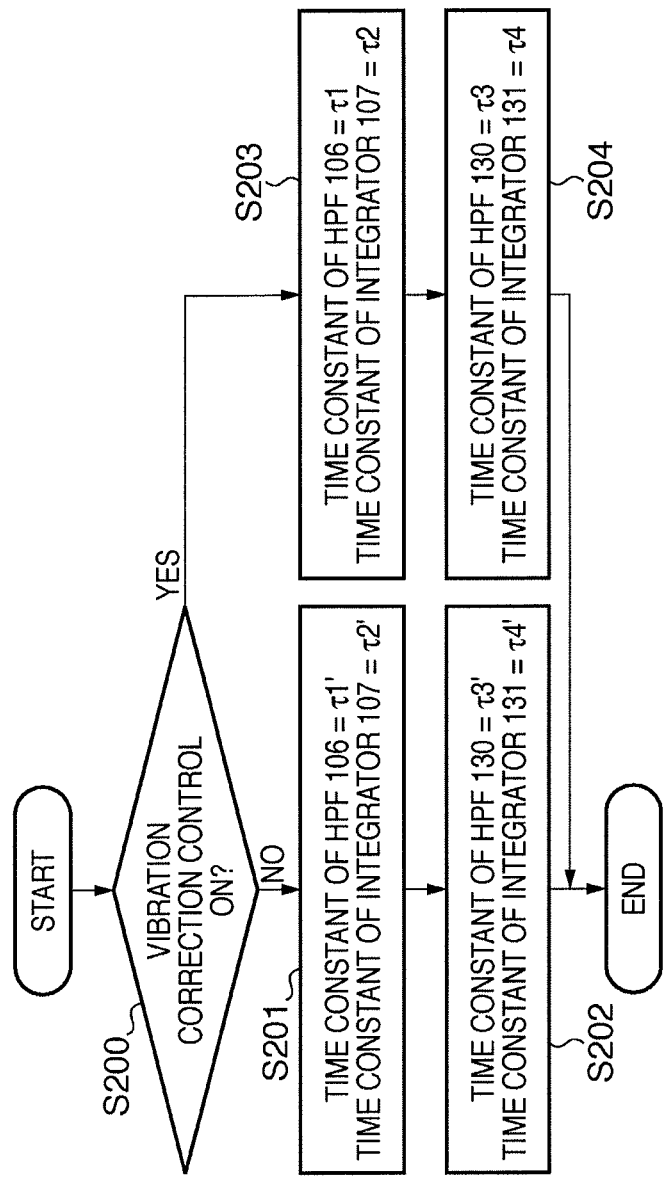
FIG. 7 is a flowchart explaining the return operation to the initial position by an initial position return control unit 128 in the second embodiment.

The operation of the initial position return control unit 128 in the second embodiment will be explained. FIG. 7 is a flowchart exemplifying processing by the initial position return control unit 128. This processing is repetitively performed in every predetermined period such as 1/60 sec.

In step S200, the initial position return control unit 128 determines whether the vibration correction ON/OFF control unit 129 has determined that the vibration correction control is ON. If the vibration correction control is OFF, the initial position return control unit 128 shifts to a process in step S201. In step S201, the initial position return control unit 128 changes the time constants of the HPF 106 and integrator 107 to τ1' and τ2', respectively, and in step S202, those of the HPF 130 and integrator 131 to τ3' and τ4', respectively. Note that the time constants are set to τ1'=τ3' and τ2'=τ4', that is, the time constants of the HPFs 106 and 130 are set equal to each other, and those of the integrators 107 and 131 are set equal to each other. Although the time constants of the HPFs 106 and 130 are set to the same value, and those of the integrators 107 and 131 are set to the same value in this description, they need not be completely the same. For example, these time constants may be slightly different as long as they are almost the same because the same effects as those obtained when the time constants are completely the same can be attained if the difference cannot be identified by the human eye.

Figure 8A:
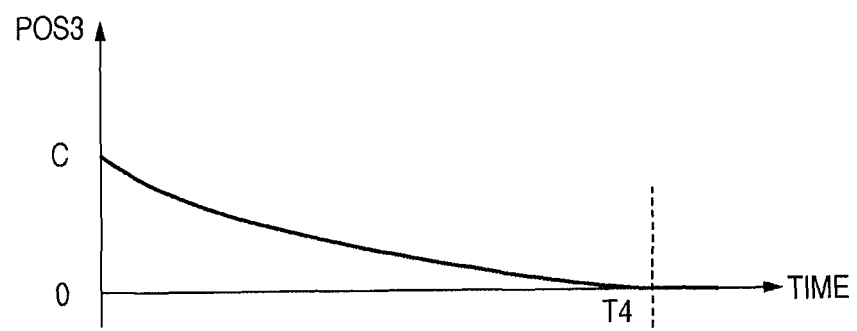
FIGS. 8A to 8C are graphs showing an example of shift of the return operations of a correction optical system 117 and a read position by a memory read control unit 124 to the initial positions when the vibration correction control is changed from ON to OFF in the second embodiment.
Figure 8B:
Figure 8C:
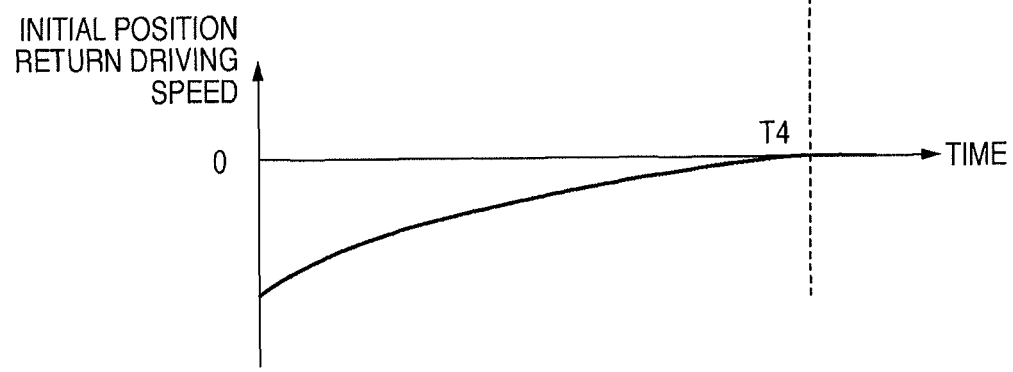

FIGS. 8A to 8C are graphs showing shift of the return operations of the correction optical system 117 and the read position by the memory read control unit 124 to the initial positions. In FIG. 8A, the ordinate indicates the intermediate position POS3 in the return operation of the correction optical system 117 to the initial position, and the abscissa indicates the time. In FIG. 8B, the ordinate indicates the intermediate position POS4 in the return operation of the read position by the memory read control unit 124 to the initial position, and the abscissa indicates the time. FIGS. 8A and 8B show loci of return to the initial positions with time by setting, as 0, the time when the vibration correction control switches from ON to OFF, setting the driving position of the correction optical system 117 at that time as C, and the read position by the memory read control unit 124 as D. The time constants of the HPF 106 and integrator 107, and those of the HPF 130 and integrator 131, which are set in the processes of steps S201 and S202 of FIG. 7, coincide with each other, respectively. The multipliers 132 and 133 set inputs to the HPFs 106 and 130 to be 0. With these settings, POS3 and POS4 smoothly converge to the initial positions, as shown in FIGS. 8A and 8B, and the return operations to the initial positions end at almost the same time T4.

In the graph of FIG. 8C, the ordinate indicates the sum (total initial position return speed) of the moving amounts of the correction optical system 117 and memory read control unit 124 per unit time, and the abscissa indicates the time. As shown in FIG. 8C, according to the second embodiment, the start timings and end timings of the return operations of the correction optical system 117 and memory read control unit 124 to the initial positions almost coincide with each other. This can prevent a phenomenon in which one return operation ends first and the total initial position return speed changes during the operation.

If it is determined in step S200 that the vibration correction control is ON, the initial position return control unit 128 shifts to a process in step S203. In step S203, the initial position return control unit 128 sets the time constants τ1 and τ2 for the vibration correction control ON state as the time constants of the HPF 106 and integrator 107, and performs the vibration correction control by the correction optical system 117. In step S204, the initial position return control unit 128 sets the time constants τ3 and τ4 for the vibration correction control ON state as the time constants of the HPF 130 and integrator 131, and executes the vibration correction control by the memory read control unit 124. After the processes in steps S203 and S204, the initial position return control unit 128 ends the processing.

As described above, according to the second embodiment, the start timings and end timings of initial position return operations after switching the vibration correction control from ON to OFF coincide with each other in an image capturing apparatus which performs the vibration correction control using a plurality of vibration correction systems. The second embodiment can effectively prevent the change in speed of initial position return operations when the operation of one vibration correction system ends first.

Third Embodiment

The arrangement of an image capturing apparatus according to the third embodiment of the present invention is the same as that shown in FIG. 1, and a description thereof will not be repeated. The third embodiment is different from the first embodiment in the operation of an initial position return control unit 128, and this operation will be explained in detail.

Figure 9:
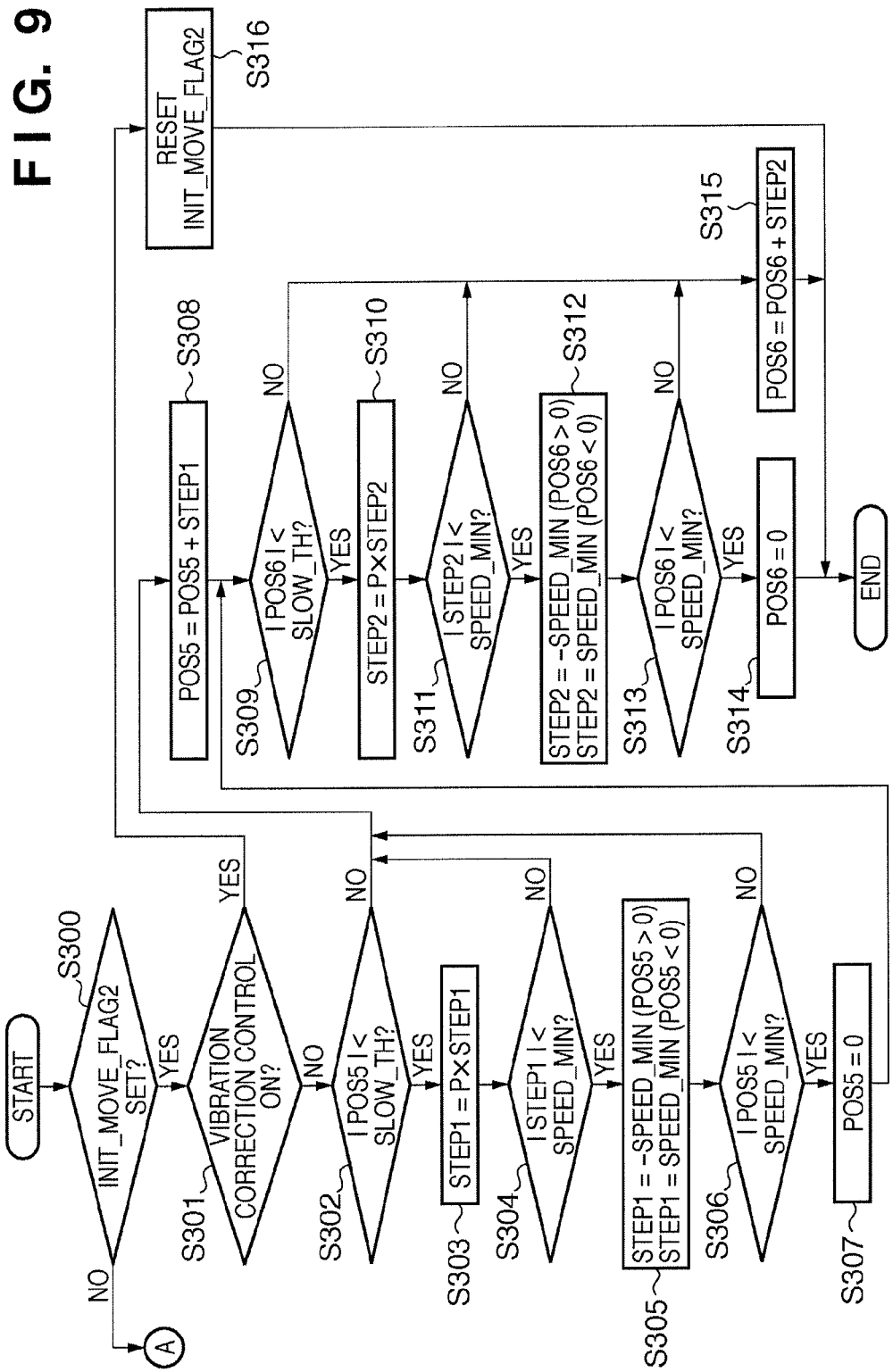
FIG. 9 is a flowchart explaining the return operation to the initial position by an initial position return control unit 128 in a third embodiment.
Figure 10:
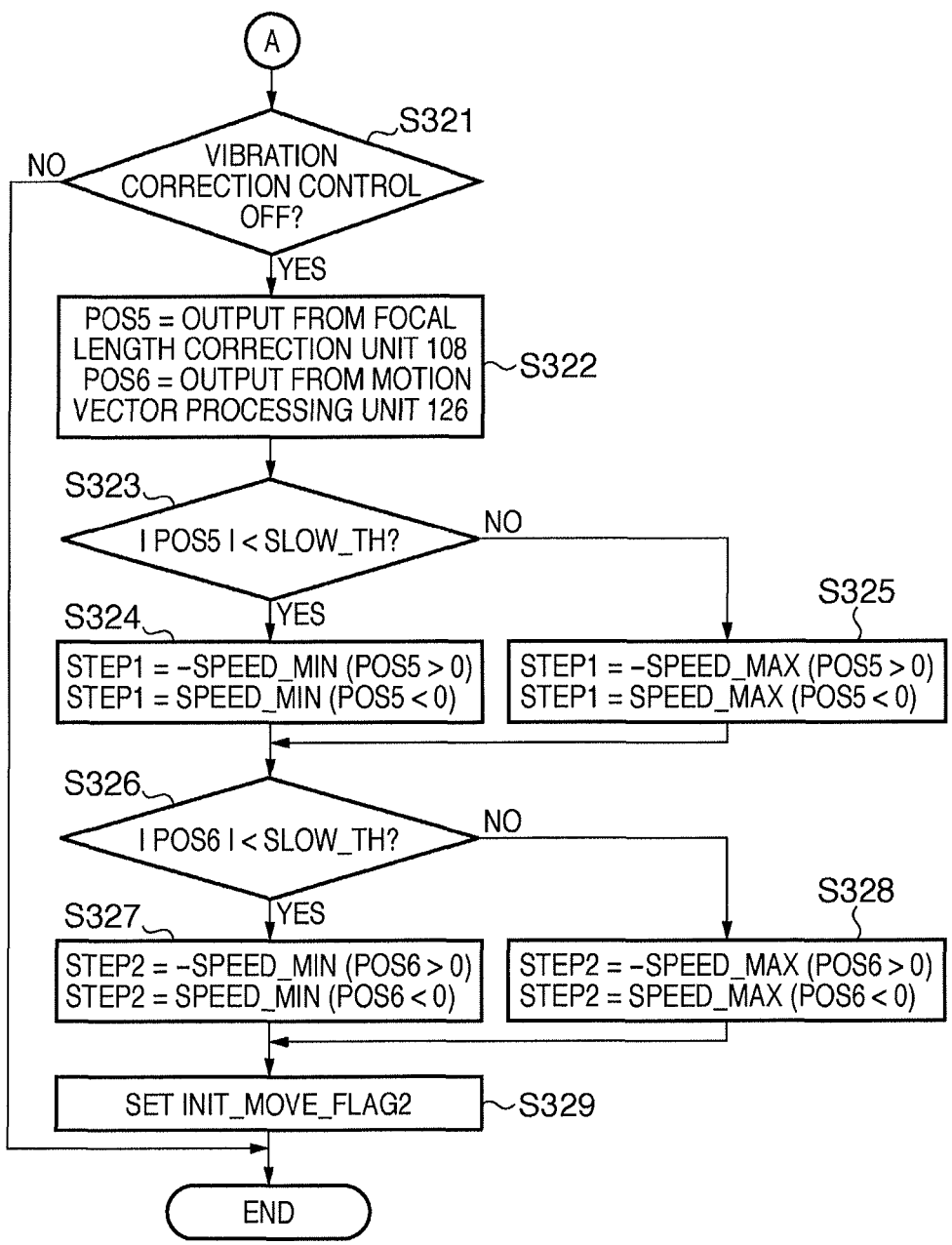
FIG. 10 is a flowchart explaining the return operation to the initial position by the initial position return control unit 128 in the third embodiment.

FIGS. 9 and 10 are flowcharts exemplifying processing by the initial position return control unit 128. This processing is repetitively performed in every predetermined period such as 1/60 sec.

In step S300, the initial position return control unit 128 determines whether a flag INIT_MOVE_FLAG2 indicating whether the initial position return operation has started has been set. If INIT_MOVE_FLAG2 has not been set, the initial position return control unit 128 determines that no initial position return operation has started, and shifts to a process in step S321 of FIG. 10.

In step S321, the initial position return control unit 128 determines whether a vibration correction ON/OFF control unit 129 has determined that the vibration correction control is OFF. If the vibration correction control is ON, the initial position return control unit 128 ends the processing; if it is OFF, shifts to a process in step S322.

POS5 is a variable which is provided from the initial position return control unit 128 to a switch 109 and indicates an intermediate position during an operation of returning a correction optical system 117 to the initial position. POS6 is a variable which is provided from the initial position return control unit 128 to a switch 127 and indicates an intermediate position during an operation of returning the image read position in an image memory 123 to the initial position. In step S322, the initial position return control unit 128 stores a current output from a focal length correction unit 108 as POS5, and stores a current output from a motion vector processing unit 126 as POS6. That is, immediately after the vibration correction control is changed from ON to OFF, the final correction positions calculated by the focal length correction unit 108 and motion vector processing unit 126 are held.

For descriptive convenience, assume that the relationship between the sign of a correction driving amount calculated by the focal length correction unit 108 and the correction direction is the same as that between the sign of a control amount calculated by the motion vector processing unit 126 and the correction direction. Also assume that, when a correction driving amount calculated by the focal length correction unit 108 and a control amount calculated by the motion vector processing unit 126 have the same value, a correction amount on the image sensing surface is also the same.

STEP1 is the amount of moving the correction optical system 117 by the initial position return control unit 128 toward the initial position in one processing of the flowchart of FIGS. 9 and 10. STEP1 takes a value within the range of SPEED_MIN≤|STEP1|≤SPEED_MAX. The initial position return speed becomes minimum for |STEP1|=SPEED_MIN and maximum for |STEP1|=SPEED_MAX.

STEP2 is the amount of moving, by the initial position return control unit 128, the read position by the memory read control unit 124 toward the initial position in one processing of the flowchart of FIGS. 9 and 10. STEP2 takes a value within the range of SPEED_MIN≤|STEP2|≤SPEED_MAX. The initial position return speed becomes minimum for |STEP2|=SPEED_MIN and maximum for |STEP2|=SPEED_MAX.

In step S323, the initial position return control unit 128 determines whether the absolute value of POS5 is smaller than a threshold SLOW_TH indicating a deceleration start position. If the absolute value of POS5 is smaller than the threshold SLOW_TH indicating a deceleration start position in step S323, that is, the position is close to the initial one, the initial position return control unit 128 advances to step S324. In step S324, the initial position return control unit 128 sets −SPEED_MIN (for POS5>0) or SPEED_MIN (for POS5<0) as STEP1 so that the initial position return speed becomes a minimum speed. If the absolute value of POS5 is equal to or larger than the threshold SLOW_TH indicating a deceleration start position in step S323, that is, the position is far apart from the initial one, the initial position return control unit 128 advances to step S325. In step S325, the initial position return control unit 128 sets −SPEED_MAX (for POS5>0) or SPEED_MAX (for POS5<0) as STEP1 so that the initial position return speed becomes a maximum speed.

In step S326, the initial position return control unit 128 determines whether the absolute value of POS6 is smaller than the threshold SLOW_TH indicating a deceleration start position. If the absolute value of POS6 is smaller than the threshold SLOW_TH indicating a deceleration start position in step S326, that is, the position is close to the initial one, the initial position return control unit 128 advances to step S327. In step S327, the initial position return control unit 128 sets −SPEED_MIN (for POS6>0) or SPEED_MIN (for POS6<0) as STEP2 so that the initial position return speed becomes a minimum speed. If the absolute value of POS6 is equal to or larger than the threshold SLOW_TH indicating a deceleration start position in step S326, that is, the position is far apart from the initial one, the initial position return control unit 128 advances to step S328. In step S328, the initial position return control unit 128 sets −SPEED_MAX (for POS6>0) or SPEED_MAX (for POS6<0) as STEP2 so that the initial position return speed becomes a maximum speed. In step S329, the initial position return control unit 128 sets INIT_MOVE_FLAG2 and ends the processing.

If INIT_MOVE_FLAG2 has been set in step S300, the initial position return control unit 128 shifts to a process in step S301. In step S301, the initial position return control unit 128 determines whether the vibration correction ON/OFF control unit 129 has determined that the vibration correction control is ON. If the vibration correction control is ON, the initial position return control unit 128 resets INIT_MOVE_FLAG2 in step S316 and ends the processing. Inputs to the switches 109 and 127 are switched to outputs from the focal length correction unit 108 and motion vector processing unit 126, respectively, and the vibration correction control starts.

If it is determined in step S301 that the vibration correction control is OFF, the initial position return control unit 128 shifts to a process in step S302. Processes in steps S302 to S308 are those of the return operation of the correction optical system 117 to the initial position.

In step S302, the initial position return control unit 128 determines whether the absolute value of POS5 is smaller than the threshold SLOW_TH of the deceleration start position. If the initial position return control unit 128 determines in step S302 that the absolute value of POS5 is equal to or larger than the threshold SLOW_TH of the deceleration start position, it advances to step S308. In step S308, the initial position return control unit 128 changes POS5 to POS5=POS5+STEP1, and provides the changed POS5 to the switch 109, performing the return operation to the initial position at the maximum speed.

If the initial position return control unit 128 determines in step S302 that the absolute value of POS5 is smaller than the threshold SLOW_TH of the deceleration start position, it advances to step S303 to multiply STEP1 by a deceleration coefficient P (0<P<1). Decreasing the absolute value of STEP1 in step S303 can decrease the return speed to the initial position. In step S304, the initial position return control unit 128 determines whether the decreased absolute value of STEP1 is smaller than SPEED_MIN. If the initial position return control unit 128 determines in step S304 that the absolute value of STEP1 is equal to or larger than SPEED_MIN, it advances to step S308. In step S308, the initial position return control unit 128 changes POS5 to POS5=POS5+STEP1, and provides the changed POS5 to the switch 109, executing the return operation to the initial position at the return speed decreased in step S303.

If the initial position return control unit 128 determines in step S304 that the absolute value of STEP1 is smaller than SPEED_MIN, it advances to step S305. Then, the initial position return control unit 128 sets −SPEED_MIN (for POS5>0) or SPEED_MIN (for POS5<0) as STEP1 so that the initial position return speed becomes a minimum speed. In step S306, the initial position return control unit 128 determines whether the absolute value of POS5 is smaller than the minimum value SPEED_MIN of STEP1. If the initial position return control unit 128 determines in step S306 that the absolute value of POS5 is equal to or larger than SPEED_MIN, it advances to step S308. In step S308, the initial position return control unit 128 changes POS5 to POS5=POS5+STEP1, and provides the changed POS5 to the switch 109, performing the return operation to the initial position at the minimum speed set in step S305.

If the initial position return control unit 128 determines in step S306 that the absolute value of POS5 is smaller than SPEED_MIN, it advances to step S307 and provides POS5=0 to the switch 109, completing the return operation of the correction optical system 117 to the initial position.

Processes in steps S309 to S315 to be executed next are those of the return operation of the read position by the memory read control unit 124 to the initial position.

In step S309, the initial position return control unit 128 determines whether the absolute value of POSE is smaller than the threshold SLOW_TH of the deceleration start position. If the initial position return control unit 128 determines in step S309 that the absolute value of POS6 is equal to or larger than the threshold SLOW_TH of the deceleration start position, it advances to step S315. In step S315, the initial position return control unit 128 changes POS6 to POS6=POS6+STEP2, and provides the changed POS6 to the switch 127, executing the return operation to the initial position at the maximum speed.

If the initial position return control unit 128 determines in step S309 that the absolute value of POS6 is smaller than the threshold SLOW_TH of the deceleration start position, it advances to step S310 to multiply STEP2 by the deceleration coefficient P (0<P<1). Decreasing the absolute value of STEP2 in step S310 can decrease the return speed to the initial position. In step S311, the initial position return control unit 128 determines whether the decreased absolute value of STEP2 is smaller than SPEED_MIN. If the initial position return control unit 128 determines in step S311 that the absolute value of STEP2 is equal to or larger than SPEED_MIN, it advances to step S315. In step S315, the initial position return control unit 128 changes POSE to POS6=POS6+STEP2, and provides the changed POS6 to the switch 127, executing the return operation to the initial position at the return speed decreased in step S310.

If the initial position return control unit 128 determines in step S311 that the absolute value of STEP2 is smaller than SPEED_MIN, it advances to step S312. Then, the initial position return control unit 128 sets −SPEED_MIN (for POS6>0) or SPEED_MIN (for POS6<0) as STEP2 so that the initial position return speed becomes a minimum speed. In step S313, the initial position return control unit 128 determines whether the absolute value of POS6 is smaller than the minimum value SPEED_MIN of STEP2. If the initial position return control unit 128 determines in step S313 that the absolute value of POSE is equal to or larger than SPEED_MIN, it advances to step S315. In step S315, the initial position return control unit 128 changes POS6 to POS6=POS6+STEP2, and provides the changed POS6 to the switch 127, performing the return operation to the initial position at the minimum speed set in step S312.

If the initial position return control unit 128 determines in step S313 that the absolute value of POS6 is smaller than SPEED_ MIN, it advances to step S314 and provides POS6=0 to the switch 127, completing the return operation of the read position by the memory read control unit 124 to the initial position.

Figure 11A:
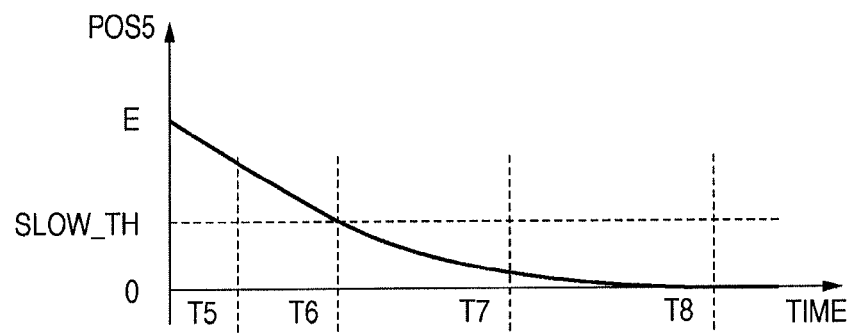
FIGS. 11A to 11C are graphs showing an example of shift of the return operations of a correction optical system 117 and a read position by a memory read control unit 124 to the initial positions when the vibration correction control is changed from ON to OFF in the third embodiment.
Figure 11B:
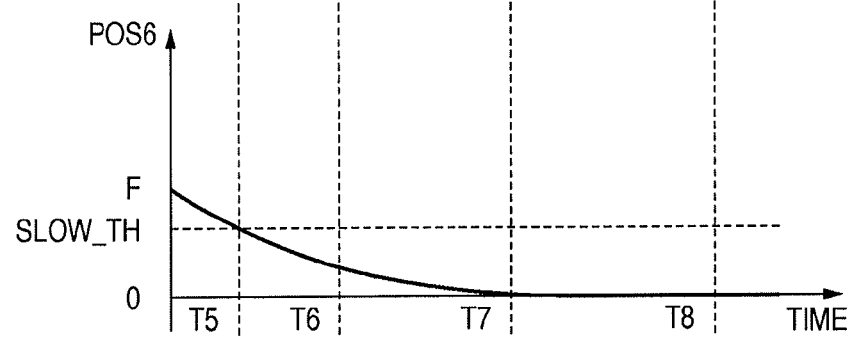
Figure 11C:
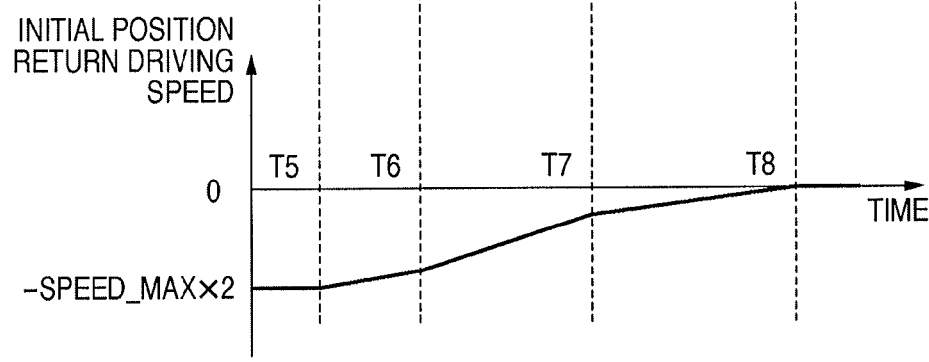

FIGS. 11A to 11C are graphs showing shift of the return operations of the correction optical system 117 and the read position by the memory read control unit 124 to the initial positions when the processing shown in the flowchart of FIGS. 9 and 10 is done. In FIG. 11A, the ordinate indicates the initial position return operation position POS5 of the correction optical system 117, and the abscissa indicates the time. In FIG. 11B, the ordinate indicates the initial position return operation position POS6 of the memory read control unit 124, and the abscissa indicates the time. FIGS. 11A and 11B show loci of return to the initial positions with time by setting, as 0, the time when the vibration correction control switches from ON to OFF, and setting the driving positions of the correction optical system 117 and memory read control unit 124 at that time as E and F. In the example shown in FIGS. 11A and 11B, both POS5 and POS6 are positive. In the graph of FIG. 11C, the ordinate indicates the sum (to be referred to as a total initial position return speed) of the moving amounts of the correction optical system 117 and memory read control unit 124 per unit time, and the abscissa indicates the time.

In the period of times 0 and T5, both POS5 and POS6 are larger than the threshold SLOW_TH indicating a deceleration start position. Thus, both the correction optical system 117 and the read position by the memory read control unit 124 return to the initial positions at the maximum speed −SPEED_MAX, and the total initial position return speed becomes −SPEED_MAX×2.

In the period of times T5 and T6, POS5 is larger than SLOW_TH indicating a deceleration start position, so the correction optical system 117 is driven at the maximum speed −SPEED_MAX. However, POS6 is smaller than SLOW_TH indicating a deceleration start position. Hence, the read position by the memory read control unit 124 is decelerated at a deceleration rate determined by the deceleration coefficient P, gradually decreasing the initial position return speed.

In the period of times T6 and T7, both POS5 and POS6 are smaller than the threshold SLOW_TH of the deceleration start position. Thus, both the correction optical system 117 and the read position by the memory read control unit 124 are decelerated at a deceleration rate determined by the deceleration coefficient P, further decreasing the initial position return speeds. At time T7, the initial position return amount STEP2 of the read position by the memory read control unit 124 becomes a minimum value −SPEED_MIN, completing the initial position return operation of the memory read control unit 124.

Since the initial position return operation of the memory read control unit 124 ends at time T7 after satisfactorily decreasing the speed, the speed change at time T7 is small as shown in FIG. 11C. This can prevent a phenomenon in which the total initial position return speed abruptly changes during the operation.

In the periods of times T7 and T8, the correction optical system 117 is subsequently decelerated at a deceleration rate determined by the deceleration coefficient P, further decreasing the initial position return speed. At time T8, the initial position return amount STEP1 of the correction optical system 117 becomes a minimum value −SPEED_MIN, completing even the initial position return operation of the correction optical system 117.

As described above, according to the third embodiment, the initial position return operation after switching the vibration correction control from ON to OFF stops after sufficiently decreasing the initial position return speed to a predetermined speed in an image capturing apparatus which performs vibration correction control using a plurality of vibration correction systems. The third embodiment can effectively prevent the change in speed of initial position return operations when the operation of one vibration correction system ends first.

Preferred embodiments of the present invention have been described above, but the present invention is not limited to these embodiments and can be variously changed and modified without departing from the scope of the invention. For example, the electronic vibration correction system using the memory read control unit 124 may be replaced with a mechanical vibration correction system which mechanically drives the image sensor 120 in a direction perpendicular to the optical axis. In this case, the initial position (initial state) of the image sensor 120 means a state in which the center of the image sensor 120 coincides with the optical axis of the image capturing apparatus.

The first to third embodiments have exemplified a method of detecting vibrations of the image capturing apparatus using two detectors, that is, the angular velocity sensor and motion vector detector. However, the image capturing apparatus may include only either detector. In this case, the vibration amount detected by one detector may be divided and corrected by a plurality of vibration correction units.

As the vibration correction unit, correction units which execute three or more different correction processes may be used. For example, the above-mentioned optical vibration correction system, electronic vibration correction system, and mechanical vibration correction system are available. By making the start timings and end timings of the return operations of the respective correction units to the initial positions coincide with each other, even an image capturing apparatus using these three vibration correction systems can obtain the same effects as those obtained by an image capturing apparatus using two correction units. Further, when the return speed of each correction unit to the initial position is satisfactorily decreased before the end of the return operation of each vibration correction unit to the initial position, even this image capturing apparatus can obtain the same effects as those obtained by an image capturing apparatus using two correction units.

In control of making the start timings and end timings of the return operations of a plurality of vibration correction units to the initial positions coincide with each other, they need not completely coincide with each other. These timings may be slightly different from each other as long as they are almost the same because the same effects can be obtained if the time difference is a time (for example, less than 0.1 sec) which cannot be identified by the human eye.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-296384, filed on Dec. 25, 2009 which is hereby incorporated by reference herein in its entirety.

What is claimed is:

1. An image capturing apparatus comprising:
a vibration detection unit configured to detect a vibration applied to the image capturing apparatus and outputting a vibration signal;
a calculation unit configured to calculate, based on the vibration signal output from said vibration detection unit, vibration correction signals;
a plurality of correction units configured to perform a plurality of correction processes, respectively, to correct the vibration based on the respective vibration correction signals calculated by said calculation unit; and
a control unit configured to, when stopping the plurality of correction processes by said plurality of correction units, shift said plurality of correction units to initial states serving as states of said plurality of correction units obtained when the vibration is not detected,
wherein said control unit performs control so that start time and end time of shifting said plurality of correction units to the initial states coincide between said plurality of correction units.

2. The apparatus according to claim 1, wherein when stopping the plurality of correction processes, said control unit controls to set, to a preset value, a sum of change amounts of signals per unit time provided to said plurality of correction units.

3. The apparatus according to claim 1, wherein
said calculation unit includes, for each of said plurality of correction units, a filter unit for removing a low frequency component of the vibration signal, and an integration unit for integrating the vibration signal, and
when stopping the plurality of correction processes based on the vibration correction signals, said control unit controls to set the vibration correction signal to be 0, set time constants of said respective filter unit to have the same value, and set time constants of said respective integration unit to have the same value.

4. The apparatus according to claim 1, wherein when said correction unit is far apart from a state determined in advance from the initial state, said control unit shifts said correction unit at the preset speed, and when said correction unit is closer than the state determined in advance from the initial state, decreases the speed at which said correction unit is shifted, to be smaller than the preset speed as said plurality of correction units come close to the initial states.

5. The apparatus according to claim 1, wherein
the image capturing apparatus includes an optical system, and an image sensing unit for sensing an object image formed by the optical system, and
said plurality of correction units include at least two of
a first correction unit configured to optically correct the vibration based on the vibration correction signal output from said calculation unit by shifting, in a direction perpendicular to an optical axis, a correction optical system for bending an optical axis of the optical system,
a second correction unit configured to correct the vibration based on the vibration correction signal output from said calculation unit by changing an image read region obtained by the image sensing unit, and
a third correction unit configured to correct the vibration based on the vibration correction signal output from said calculation unit by shifting a position of the image sensing unit in a direction perpendicular to the optical axis.

6. An image capturing apparatus comprising:
a vibration detection unit configured to detect a vibration applied to the image capturing apparatus and outputting a vibration signal;
a calculation unit configured to calculate, based on the vibration signal output from said vibration detection unit, vibration correction signals;
a first correction unit configured to optically correct the vibration based on the vibration correction signal output from said calculation unit by moving a correction optical unit in a direction different from an optical axis;
a second correction unit configured to correct the vibration based on the vibration correction signal output from said calculation unit by changing an image read region obtained by an image sensing unit;
a control unit configured to, when stopping the correction processes by said first correction unit and said second correction unit, shift said first correction unit and said second correction unit to initial states serving as states of said first correction unit and said second correction unit obtained when the vibration is not detected;
wherein said control unit performs control so that start time and end time of shifting said first correction unit and said second correction unit to the initial states coincide between said first correction unit and said second correction unit.

7. The apparatus according to claim 6, wherein when stopping the plurality of correction processes, said control unit controls to set, to a preset value, a sum of change amounts of signals per unit time provided to said first correction unit and said second correction unit.

8. The apparatus according to claim 6, wherein
said calculation unit includes, for each of said first correction unit and said second correction unit, a filter unit for removing a low frequency component of the vibration signal, and an integration unit for integrating the vibration signal, and
when stopping the plurality of correction processes based on the vibration correction signals, said control unit controls to set the vibration correction signal to be 0, set time constants of said respective filter unit to have the same value, and set time constants of said respective integration unit to have the same value.

9. The apparatus according to claim 6, wherein when one of said first correction unit and said second correction unit is far apart from a state determined in advance from the initial state, said control unit shifts said correction unit at the preset speed, and when one of said first correction unit and said second correction unit is closer than the state determined in advance from the initial state, decreases the speed at which said correction unit is shifted, to be smaller than the preset speed as the other of said first correction unit and said second correction unit comes close to the initial states.

10. A method of controlling an image capturing apparatus including a plurality of correction units used for vibration correction, the method comprising:
a vibration detection step of detecting a vibration applied to the image capturing apparatus and outputting a vibration signal;
a calculation step of calculating, based on the vibration signal output from said vibration detection step, vibration correction signals;
a correction control step of performing a plurality of correction processes by the plurality of correction units, respectively, to correct the vibration based on the respective vibration correction signals calculated in said calculation step; and a control step of, when stopping the plurality of correction processes by said plurality of correction units, shifting said plurality of correction units to initial states serving as states of said plurality of correction units obtained when the vibration is not detected, wherein said control unit performs control so that start time and end time of shifting said plurality of correction units to the initial states coincide between said plurality of correction units.

11. A method of controlling an image capturing apparatus including a first correction unit and a second correction unit used for vibration correction, the method comprising:

a vibration detection step of detecting a vibration applied to the image capturing apparatus and outputting a vibration signal;

a calculation step of calculating, based on the vibration signal output from said vibration detection step, vibration correction signals;

a first correction step of optically correcting the vibration based on the vibration correction signal output from said calculation step by moving a correction optical unit in a direction different from an optical axis;

a second correction step of correcting the vibration based on the vibration correction signal output from said calculation step by changing an image read region obtained by an image sensing unit;

a control step of, when stopping the correction processes by said first correction unit and said second correction unit, shifting said first correction unit and said second correction unit to initial states serving as states of said first correction unit and said second correction unit obtained when the vibration is not detected;

wherein said control unit performs control so that start time and end time of shifting said first correction unit and said second correction unit to the initial states coincide between said first correction unit and said second correction unit.

12. An image capturing apparatus comprising:

a vibration detection unit configured to detect a vibration applied to the image capturing apparatus and outputting a vibration signal;

a calculation unit configured to calculate, based on the vibration signal output from said vibration detection unit, vibration correction signals;

a plurality of correction units configured to perform a plurality of correction processes, respectively, to correct the vibration based on the respective vibration correction signals calculated by said calculation unit; and a control unit configured to, in response to turning off the plurality of correction processes by said plurality of correction units, return states of said plurality of correction units to initial states, wherein said control unit performs control so that start time and end time of returning states of said plurality of correction units to the initial states coincide between said plurality of correction units.

13. The apparatus according to claim 12, wherein in response to turning off the plurality of correction processes, said control unit controls to set, to a preset value, a sum of change amounts of signals per unit time provided to said plurality of correction units.

14. The apparatus according to claim 12, wherein said calculation unit includes, for each of said plurality of correction units, a filter unit for removing a low frequency component of the vibration signal, and an integration unit for integrating the vibration signal, and in response to turning off the plurality of correction processes based on the vibration correction signals, said control unit controls to set the vibration correction signal to be 0, set time constants of said respective filter unit to have the same value, and set time constants of said respective integration unit to have the same value.

15. The apparatus according to claim 12, wherein when said correction unit is far apart from a state determined in advance from the initial state, said control unit shifts said correction unit at the preset speed, and when said correction unit is closer than the state determined in advance from the initial state, decreases the speed at which said correction unit is returned, to be smaller than the preset speed as said plurality of correction units come close to the initial states.

16. The apparatus according to claim 12, wherein
the image capturing apparatus includes an optical system, and an image sensing unit for sensing an object image formed by the optical system, and said plurality of correction units include at least two of
a first correction unit configured to optically correct the vibration based on the vibration correction signal output from said calculation unit by shifting, in a direction perpendicular to an optical axis, a correction optical system for bending an optical axis of the optical system, a second correction unit configured to correct the vibration based on the vibration correction signal output from said calculation unit by changing an image read region obtained by the image sensing unit, and a third correction unit configured to correct the vibration based on the vibration correction signal output from said calculation unit by shifting a position of the image sensing unit in a direction perpendicular to the optical axis.

17. An image capturing apparatus comprising:

a vibration detection unit configured to detect a vibration applied to the image capturing apparatus and outputting a vibration signal;

a calculation unit configured to calculate, based on the vibration signal output from said vibration detection unit, vibration correction signals;

a first correction unit configured to optically correct the vibration based on the vibration correction signal output from said calculation unit by moving a correction optical unit in a direction different from an optical axis;

a second correction unit configured to correct the vibration based on the vibration correction signal output from said calculation unit by changing an image read region obtained by an image sensing unit;

a control unit configured to, in response to turning off the correction processes by said first correction unit and said second correction unit, return states of said first correction unit and said second correction unit to initial states;

wherein said control unit performs control so that start time and end time of returning states of said first correction unit and said second correction unit to the initial states coincide between said first correction unit and said second correction unit.

18. A method of controlling an image capturing apparatus including a plurality of correction units used for vibration correction, the method comprising:

a vibration detection step of detecting a vibration applied to the image capturing apparatus and outputting a vibration signal;

a calculation step of calculating, based on the vibration signal output from said vibration detection step, vibration correction signals;

a correction control step of performing a plurality of correction processes by the plurality of correction units, respectively, to correct the vibration based on the respective vibration correction signals calculated in said calculation step; and a control step of, in response to turning off the plurality of correction processes by said plurality of correction units, returning states of said plurality of correction units to initial states, wherein said control unit performs control so that start time and end time of returning states of said plurality of correction units to the initial states coincide between said plurality of correction units.

19. A method of controlling an image capturing apparatus including a first correction unit and a second correction unit used for vibration correction, the method comprising:

a vibration detection step of detecting a vibration applied to the image capturing apparatus and outputting a vibration signal;

a calculation step of calculating, based on the vibration signal output from said vibration detection step, vibration correction signals;

a first correction step of optically correcting the vibration based on the vibration correction signal output from said calculation step by moving a correction optical unit in a direction different from an optical axis;

a second correction step of correcting the vibration based on the vibration correction signal output from said calculation step by changing an image read region obtained by an image sensing unit;

a control step of, in response to turning off the correction processes by said first correction unit and said second correction unit, returning states of said first correction unit and said second correction unit to initial states;

wherein said control unit performs control so that start time and end time of returning states of said first correction unit and said second correction unit to the initial states coincide between said first correction unit and said second correction unit.

* * * * *